Dec. 26, 1950     L. L. HYLER     2,535,927
HITCH CONSTRUCTION
Filed July 22, 1946     3 Sheets-Sheet 1
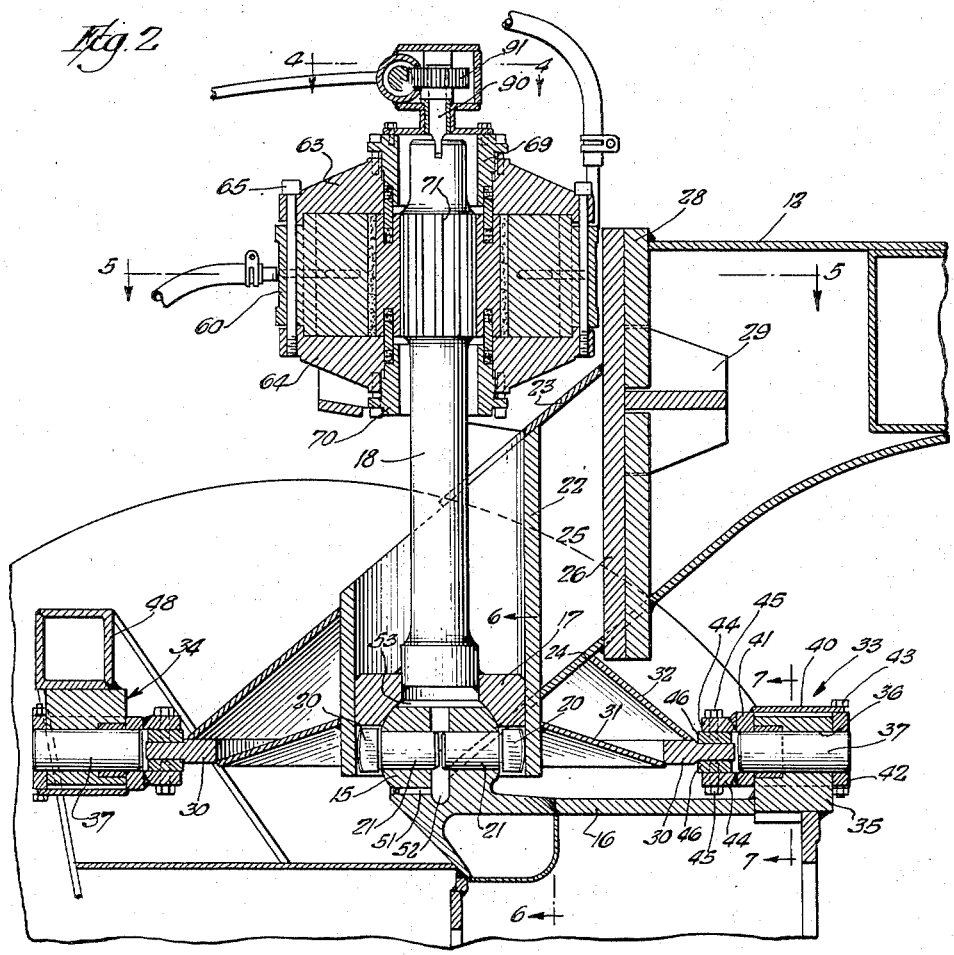
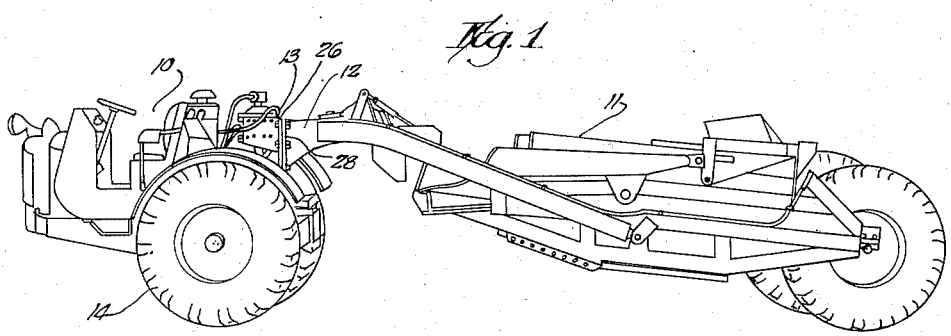
Inventor
Loiell L. Hyler
By Thiess, Olsen & Mecklenburger
Attys.

Dec. 26, 1950 L. L. HYLER 2,535,927
HITCH CONSTRUCTION
Filed July 22, 1946 3 Sheets-Sheet 2

Inventor
Loiell L. Hyler
By Thiess, Olson & Mecklenburger
Attys.

Dec. 26, 1950     L. L. HYLER     2,535,927
HITCH CONSTRUCTION
Filed July 22, 1946     3 Sheets-Sheet 3
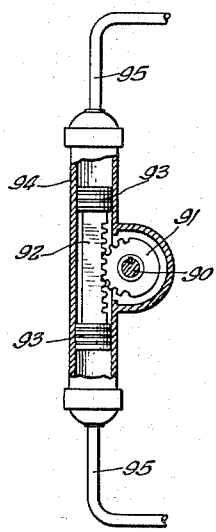
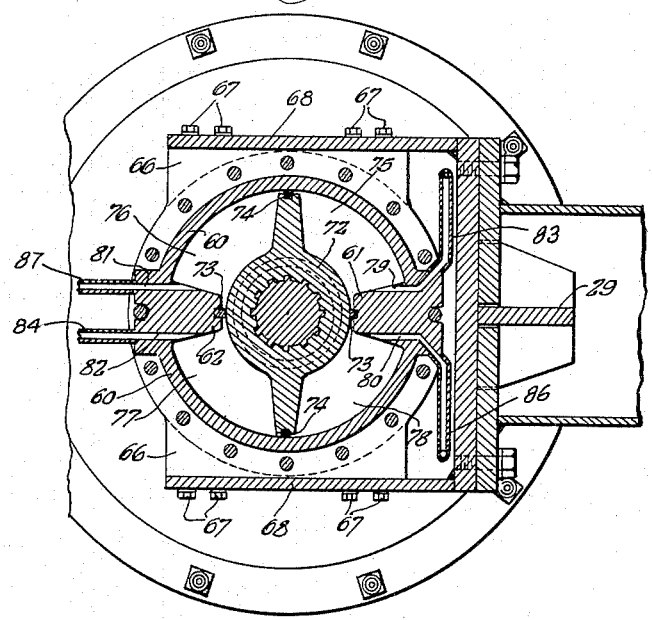
Inventor
Loiell L. Hyler
By Thiess, Olsen & Mecklenburger
Attys.

Patented Dec. 26, 1950

2,535,927

UNITED STATES PATENT OFFICE 2,535,927

HITCH CONSTRUCTION

Loiell L. Hyler, Cedar Rapids, Iowa, assignor to La Plant-Choate Manufacturing Co., Inc., Cedar Rapids, Iowa, a corporation of Delaware Application July 22, 1946, Serial No. 685,433

4 Claims. (Cl. 280—33)

This invention relates to vehicles of the type comprising a trailer and a prime mover, more particularly to hitch constructions for connecting the trailer to the prime mover in steerable load-supporting relation, and the invention has for an object the provision of improved rugged and reliable hitch constructions for vehicles of this character.

Although the present invention is not limited thereto it is particularly applicable to and will be shown and described in connection with hitch constructions for vehicles comprising a two-wheel prime mover and an earth-moving trailer vehicle, such as a scraper, for excavating, transporting and discharging earth and similar materials. The advantages of employing two-wheel prime movers in earth-moving apparatus of this type have heretofore been recognized, particularly where it is necessary or desirable to transport the material substantial distances between the place of excavation and the place of discharge. The high speed operation which is obtainable when employing two-wheel prime movers as compared to the speeds obtainable when employing track-laying or crawler-type tractors as the prime mover, is an important factor in economy of operation and enables substantial reductions in the time required for completing any particular earth-moving job. However, difficulties have been encountered in providing simple and satisfactory hitch mechanisms capable of withstanding the heavy strains encountered and of supporting the loads involved in moving large quantities of earth over uneven and variable terrain.

In prior earth-moving vehicles of the type above indicated, hitch constructions have been employed which serve as part of the steering mechanism and include various gears, sprockets, chains and levers for effecting steering control of the hitch mechanism. Such prior constructions have involved excessive expense and difficulties in manufacture, and have been a source of trouble in operation through breakage and excessive wear of the parts due to insufficient bearing surfaces and improper design. Accordingly, it is a further object of this invention to provide a trouble-free hitch construction for connecting a prime mover and a trailer in steerable relation, which is capable of ready assembly and of operation over long periods under heavy loads without breakage or excessive wear.

In carrying out the invention in one form a vehicle including a trailer and a prime mover is provided with a hitch construction comprising an upstanding element mounted on the prime mover in nonrotatable relation thereto, and a hollow member secured in nonrotatable relation to the trailer is journaled on the upstanding element for rotation relative to the prime mover, the hollow member including means extending outwardly therefrom and terminating in an annular flange slidably supported in bearing means carried by the prime mover and engaging the upper and lower surfaces of the flange in load-transmitting relation at spaced points about the periphery of the flange.

More particularly, the upstanding element is mounted on the prime mover for pivotal relation in a plane substantially at right angles to the longitudinal axis of the prime mover, and the annular flange, which is suitably hardened, is connected to the hollow member by a conical skirt portion, the bearing means for engaging the flange being positioned on the longitudinal axis of the prime mover on opposite sides of the upstanding element to permit pivotal movement of the hollow member and flange with the upstanding element. Suitable means, preferably hydraulic, are provided for effecting relative rotation between the upstanding element and the hollow member to turn the prime mover relative to the trailer and thereby effect steering of the vehicle.

For a more complete understanding of the invention, reference should now be had to the drawings in which:

Fig. 1 is an elevational view of a vehicle wherein the two-wheel prime mover and the trailer are connected by a hitch construction embodying the present invention;

Fig. 2 is a vertical sectional view on a larger scale taken through the centerline of the hitch construction employed in the vehicle of Fig. 1;

Fig. 4 is a detail view partly in section taken along the line 4—4 of Fig. 2;

Figure 3:
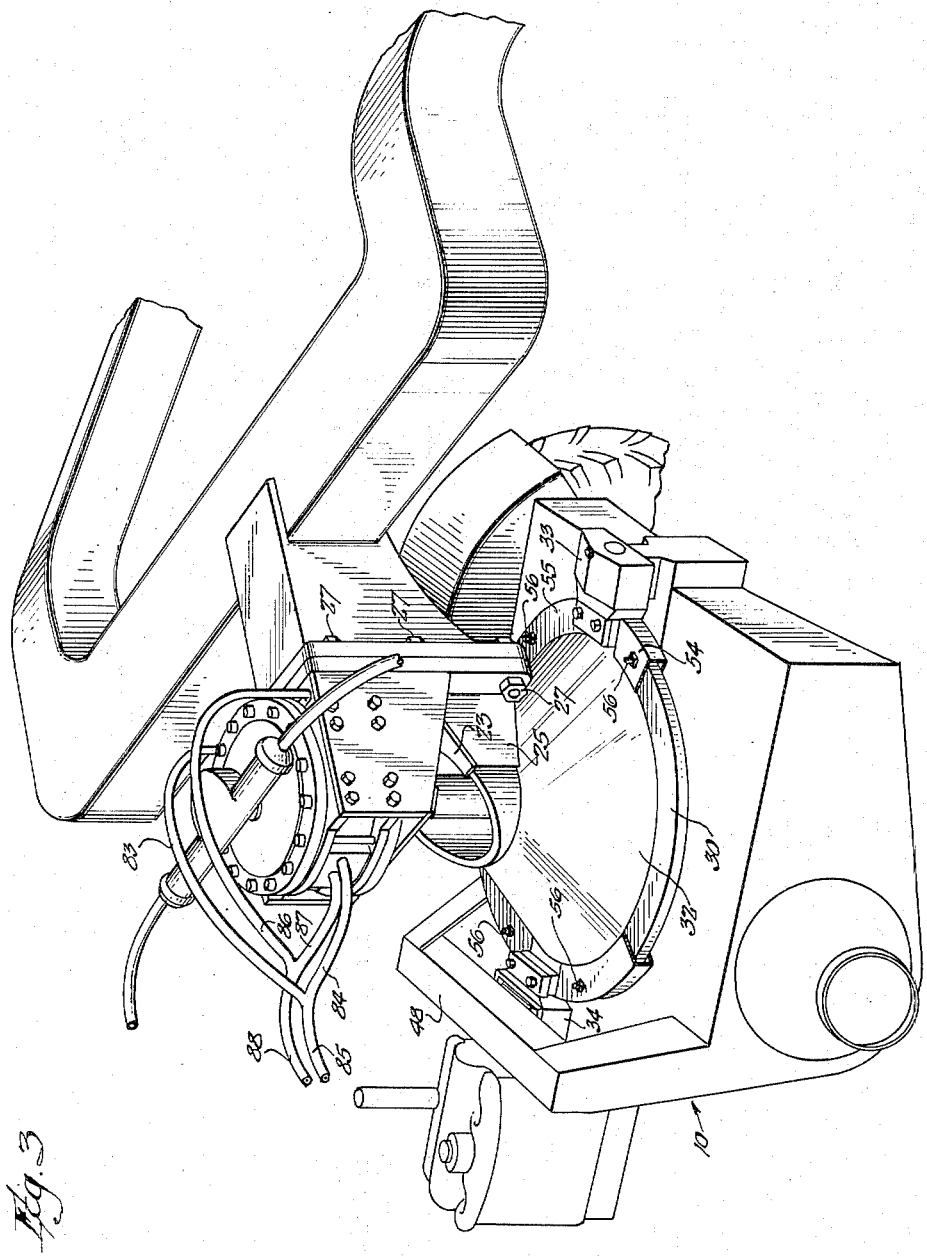
Fig. 3 is a fragmentary somewhat diagrammatic perspective view of the hitch construction shown in Fig. 2, portions of the prime mover and the trailer vehicle being omitted in order more clearly to illustrate the structure of the hitch.

Fig. 5 is a fragmentary view partly in section taken along the line 5—5 of Fig. 2; and Figs. 6 and 7 are detail sectional views taken along the lines 6—6 and 7—7, respectively, of Fig. 2.

Referring now to the drawings, the invention is shown as embodied in an earth-moving vehicle comprising a two-wheel prime mover unit 10 and a two-wheel scraper or trailer vehicle 11 of a type well known in the art. The scraper 11 is provided at its forward end with a conventional gooseneck 12 adapted to be secured to a hitch construction 13 embodying the present invention, whereby the traction wheels 14 of the prime mover support a portion of the weight of the scraper and the weight of the material carried thereby. It will be seen that both the prime mover 10 and the trailer vehicle 11 are of the unstable type adapted to form a stable vehicle only when connected together through the yoke connection and the hitch construction 13.

As shown best in Figs. 2 and 6, the hitch construction embodying the invention includes a ball-like support 15 mounted on a portion 16 of the prime mover substantially on the longitudinal center line of the prime mover and substantially over the axis of rotation of the wheels 14. Cooperating with the ball-like support 15 is a socket 17 to which is rigidly secured an upstanding element or post 18. The socket 17 is provided with square or otherwise noncircular apertures 19 in opposite sides thereof adapted to receive the correspondingly formed heads 20 of a pair of pins 21 having shank portions which extend into suitable cylindrical apertures in the ball-like member 15. Inasmuch as the shank portions of the pins 21 are rotatable in the apertures in the ball support 15, the socket 17 and the post 18 are secured to the prime mover for pivotal movement in a plane at right angles to the longitudinal center line of the prime mover but are locked by the pins 21 against rotation about a vertical axis with respect to the prime mover, the square heads 20 providing large flat bearing surfaces for transmitting to the prime mover any turning movement exerted by the post 18.

Surrounding the post 18 and engaging the outer periphery of the socket 17 is a hollow member or pedestal 22 which is provided with an upwardly inclined hollow arm including top and bottom plates 23 and 24 connected by side plates 25, which hollow arm terminates in a vertically disposed mounting plate 26 adapted to be secured by suitable screws and bolts 27 to a cooperating plate 28 carried on the forward end of the gooseneck 12. As shown best in Figs. 2 and 5, the mounting plate 26 is provided with a key 29 preferably in the shape of a cross adapted to extend through a similarly cross-shaped slot in the plate 28 in order properly to position the connecting plates 26 and 28 relative to each other when the prime mover and the scraper are connected together.

Although a rather large bearing surface is provided by the construction heretofore described between the hollow member 22 and the socket 17 on which the post 18 is mounted, the extremely heavy stresses and loads encountered during operation of a scraper vehicle of the type herein disclosed requires further support of the hollow member 22 which is rigidly connected to the trailer or scraper vehicle 11 so as to adequately support the front end of the trailer vehicle while permitting relative turning movement between the trailer and the prime mover to effect steering of the vehicle. Accordingly, as shown best in Figs. 2, 3 and 6, a hardened annular member or flange 30 is provided surrounding the pedestal 22 adjacent the lower end thereof which annular member is rigidly connected to the pedestal 22 by a pair of substantially frustoconical skirt portions 31 and 32. Although this supporting structure may be fabricated in any desired manner, the skirt portions 31 and 32 are preferably welded at their upper ends to the pedestal 22 and at their lower ends to the hardened annular member 30 so as to provide a rigid structure.

In order to support the annular member in load-transmitting relation to the prime mover while at the same time permitting relative pivotal movement between the prime mover and the trailer vehicle in planes transverse to the longitudinal axis thereof, suitable bearing units 33 and 34 are provided mounted on the prime mover on substantially the center line thereof on opposite sides of pedestal 22 so as to engage the hardened annular member 30 at peripherally spaced points. The bearing units 33 and 34, although mounted in inverse relation, are identical in construction, and only the bearing unit 33 will be described in detail, similar reference numerals being used to indicate like parts in the two bearing units.

Referring to Figs. 2 and 7, the bearing unit 33 comprises a spud or supporting member 35 rigidly secured to and extending upwardly from a portion 16 of the frame of the prime mover, which spud 35 is provided with an aperture 36 for receiving a pin 37. Surrounding the spud 35 in pivotal relation thereto is a housing comprising spaced apart side plates 39 connected together by a top member 40 and by front and rear plates 41 and 42 respectively, the front and rear plates 41 and 42 being suitably apertured for receiving the extending ends of the pin 37, the housing being locked to the pin 37 by means of a suitable bolt 43 which extends through cooperating apertures in the pin 37 and the back plate of the housing. It will thus be apparent that the housing is supported on the spud 35 for pivotal movement in planes substantially at right angles to the axis of the prime mover.

Extending forwardly from the front plate 41 of the bearing housing are horizontally disposed spaced apart plates 44 to which are secured by suitable bolts 45 wear plates 46 adapted to engage the upper and lower surfaces of the hardened annular flange 30. It will be understood, of course, that the wear plates 46 may be suitably shimmed to take up any wear occurring between these plates and the flange so as to maintain at all times the proper load-transferring relation between the hardened flange 30 and the bearing structure 33. As previously indicated, bearing unit 34 is inverted with respect to the bearing unit 33, and as shown best in Figs. 2 and 3 is secured to a suitable transverse beam 48 which extends across and forms a part of the frame of the prime mover 10. Inasmuch as the hardened annular flange 30 is disposed in the same horizontal plane as the pins 21 which connect the socket 17 to the ball support 15, and since the pins 37 in the bearing units 33 and 34 are in alignment with the pins 21, the hardened annular flange and the skirt portions 31 and 32, while slidably supported in rotatable relation to the wear plate 46, are capable of tilting movement with the pedestal 22 and the post 18 as indicated by the broken lines 49 and 50 in Fig. 7.

In order to provide for proper lubrication of the various bearing surfaces, the ball support 15 is provided, as shown, with a lubricating duct 51 which communicates with a central chamber 52 leading to the space 53 provided between the ball support 15 and the socket 17 by the flattened upper surface of the ball support 15. Thus grease or other suitable lubricant forced into the grease duct 51 will find its way into the space 53 and from there will travel downwardly around the outer periphery of the ball to form a lubricating film between the ball and socket. Lubrication of the bearing surface between the pedestal 22 and the outer periphery of the socket 17 may be achieved merely by introducing a suitable lubricant through the open upper end of the pedestal 22, which open upper end may be provided with a suitable protecting cover if desired.

Lubrication of the hardened annular flange 30 and protection of the flange from the abrasive action of dust and similar particles is accomplished by providing suitable sector-shaped dust shields and lubricant containers 54 and 55 (Fig. 3) which extend between the bearing units 33 and 34 so as to substantially enclose the flange 30. These dust shields 54 and 55 are substantially U-shaped in cross section with the top and bottom walls tapering inwardly so as to frictionally engage the flange 30 and suitable grease fittings 56 are provided for introducing lubricant into the space between the shields 54 and 55 and the flange 30.

It will now be apparent that hitch structures embodying the present invention provide a compact and rugged steerable connection between the prime mover and the trailer vehicle, and in order to effect power steering of the prime mover any suitable power operating means may be employed for effecting rotation of the post 18 so as to turn the prime mover relative to the trailer vehicle. In the embodiment of the invention shown in the drawings, the means for rotating the post 18 to effect steering is illustrated as constituting hydraulic means of the type described and claimed in a copending application of Harvey W. Rockwell, Serial No. 685,317, filed July 22, 1946, now Patent No. 2,521,652, granted Sept. 5, 1950, entitled Steering Mechanisms, which application is assigned to the same assignee as the present invention. The said Rockwell application discloses a modified form of hitch construction embodying the present invention wherein the hydraulic operator or ram is mounted directly on and forms a part of the hollow member or pedestal to which the trailer vehicle is secured.

In the form of invention herein shown, however, the hydraulic operator comprises a housing rigidly secured to the mounting plate 26 to which the pedestal member 22 is likewise secured so that the same rigid relation is achieved as in the said Rockwell application. Referring particularly to Figs. 2, 4 and 5 the hydraulic operating mechanism comprises a housing which includes a cylindrical side wall member 60 provided with inwardly projecting opposed wall portions 61 and 62 (Fig. 5) and cooperating top and bottom plates 63 and 64, respectively. Suitable bolts 65 are arranged to secure the side wall portion and the top and bottom plates together in fluid-tight relation so as to provide a hydraulic cylinder, and extending portions 66 on the top and bottom plates 63 and 64 are secured by bolts 67 to supporting plates 68 which extending outwardly from the mounting plate 26, whereby the fluid-tight housing is secured in rigid relation to the mounting plate 26 and the pedestal 22.

As shown best in Fig. 2, the post 18 extends through suitable apertures in the top and bottom plates 63 and 64, suitable sealing means 69 and 70 being provided as is more fully described in the said copending Rockwell application, and the portion of the post 18 extending through the housing is splined as indicated by the reference numeral 71 for cooperatively engaging the hub portion of a double-acting vane 72 (Fig. 5). The inwardly projecting wall portions 61 and 62 are provided with suitable sealing members 73 which engage the periphery of the hub of the vane member 72, and the outer ends of the vanes are provided with sealing members 74 for similarly engaging the internal walls of the side wall member 60. Thus a plurality of fluid-tight chambers 75, 76, 77 and 78 are provided for receiving hydraulic medium under pressure in order to effect rotation of the vane member 72 to drive the steering element or post 18, and the inwardly projecting wall portions 61 and 62 are provided with suitable ducts 79, 80, 81 and 82 through which the fluid pressure medium may be supplied.

As shown best in Figs. 3 and 5, the ducts 79 and 82 are interconnected by conduits 83 and 84 to a common supply and exhaust conduit 85, and the ducts 80 and 81 are similarly connected through conduits 86 and 87 to a common supply and exhaust conduit 88. Thus fluid under pressure may be simultaneously supplied through the conduit 85 to the chambers 75 and 77 to effect rotation of the vane member 72 in a counterclockwise direction, as shown in Fig. 5, or fluid pressure may be supplied through the conduit 88 to the chambers 76 and 78 to effect rotation of the vane member 72 in a clockwise direction.

Any suitable means may be employed for selectively applying fluid pressure to the hydraulic operating unit thus far described, and for the purposes of the present invention it is not believed necessary to illustrate or describe in detail the particular control means described and claimed in the aforesaid Rockwell application. For purposes of completeness, however, it should be pointed out that the instrumentality illustrated in Figs. 3, 4 and 5 as being mounted directly over the fluid operator comprises a hydraulic follow-up mechanism adapted to be driven by the rotatable post 18 to effect accurate control of the steering. This follow-up mechanism includes a stub shaft 90 carrying a gear 91 adapted to mesh with a rack 92 having pistons 93 carried on the opposite ends thereof adapted to move within a cylinder 94 for producing differential pressures corresponding to movements of the steering post 18. The differential pressures thus produced are transmitted through suitable conduits 95 communicating with opposite ends of the cylinder 94 and are utilized in accordance with the invention of the aforesaid Rockwell application to control the supply of fluid pressure to the vane type fluid-operating means heretofore described.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patent is:

1. In a vehicle including a trailer and a prime mover, a hitch comprising an upstanding element mounted on said prime mover in nonrotatable relation thereto, a hollow member secured in nonrotatable relation to said trailer and journaled on said element for rotation relative to said prime mover, rigid means extending outwardly from said hollow member and terminating in a hardened annular flange, spaced apart bearing means on said prime mover independent of and remote from said element including replaceable wear plates engaging the upper and lower surfaces of said flange in load-transmitting relation at spaced points about the periphery thereof, and segmental cover members of substantially U-shaped cross section extending between said bearing means and encompassing said flange to form a continuous dust shield and lubricant container therefor.

2. In a vehicle including a trailer and a prime mover, a hitch comprising an upstanding element mounted on said prime mover in nonrotatable relation thereto, a hollow member secured in nonrotatable relation to said trailer and journaled on said element for rotation relative to said prime mover, a substantially conical rigid skirt extending outwardly from said hollow member and terminating in an annular hardened flange, spaced apart bearing means on said prime mover independent of said element and in spaced relation thereto for slidably engaging the upper and lower surfaces of said flange in load transmitting relation at spaced points about the periphery thereof, and segmental cover members of substantially U-shaped cross section encompassing the portions of said flange between said bearing means and permitting sliding movement of said flange therein to form a continuous dust shield and lubricant container for said flange.

3. In a vehicle including a trailer and a prime mover, a hitch comprising an upstanding element pivotally mounted on said prime mover in nonrotatable relation thereto, a hollow member secured in nonrotatable relation to said trailer and journaled on said element for rotation relative to said prime mover, rigid means extending outwardly from said hollow member terminating in a hardened annular flange, a pair of bearings disposed on opposite sides of said element and including wear plates slidably engaging the upper and lower surfaces of said flange to support said hollow member for said relative rotation, means pivotally mounting said bearings on said prime mover to permit pivotal movement of said flange and said hollow member with said element, and segmental cover members of substantially U-shaped cross section encompassing the portions of said flange between said bearings and permitting sliding movement of said flange therein, said cover members extending between said bearings to form a continuous dust shield and lubricant container for said flange.

4. In a vehicle including a trailer and a prime mover, the combination of a ball-like support on said prime mover, an upstanding element having a substantially hemispherical socket on the lower end thereof for receiving said support to provide a ball-and-socket connection, said ball and said socket having alignable apertures therein, pin means extending through said apertures for locking said element against rotation relative to said prime mover while permitting pivotal movement at right angles to said pin means, a hollow pedestal surrounding said element and secured in nonrotatable relation to said trailer, a rigid substantially conical skirt extending outwardly from said pedestal and terminating in an annular flange disposed in a plane coincident with the axis of said pin means, a pair of bearings disposed on opposite sides of said pedestal and engaging said flange to support said pedestal for rotation relative to said prime mover, means including pins coaxial with said pin means mounting said bearings for pivotal movement to permit pivoting of said pedestal with said member, segmental cover members of substantially U-shaped cross section extending between said bearings and embracing said flange to provide a continuous dust shield and lubricant container therefor, and means for effecting relative rotation between said element and said pedestal to steer said vehicle.

LOIELL L. HYLER.

REFERENCES CITED

The following references are of record in the file of this patent:

UNITED STATES PATENTS

| Number | Name | Date |
| --- | --- | --- |
| 2,361,935 | French | Nov. 7, 1944 |
| 2,368,202 | Clark | Jan. 30, 1945 |
| 2,399,278 | Le Tourneau | Apr. 30, 1946 |
| 2,400,218 | Akers | May 14, 1946 |